July 2, 1929.  E. NISSEN ET AL  1,719,518
ADVERTISING DEVICE
Filed Feb. 13, 1929  3 Sheets-Sheet 1
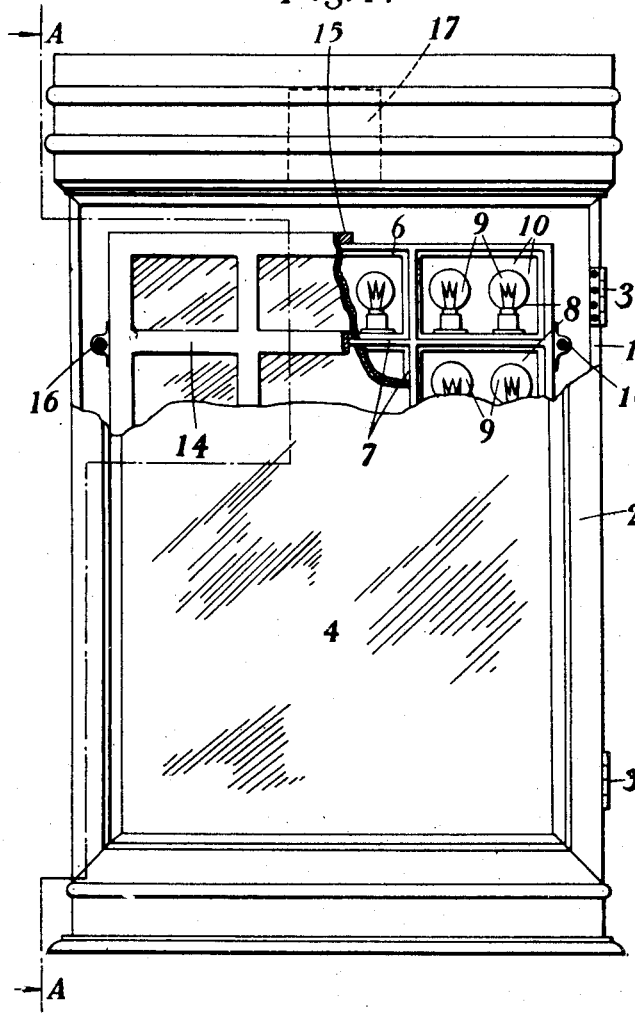
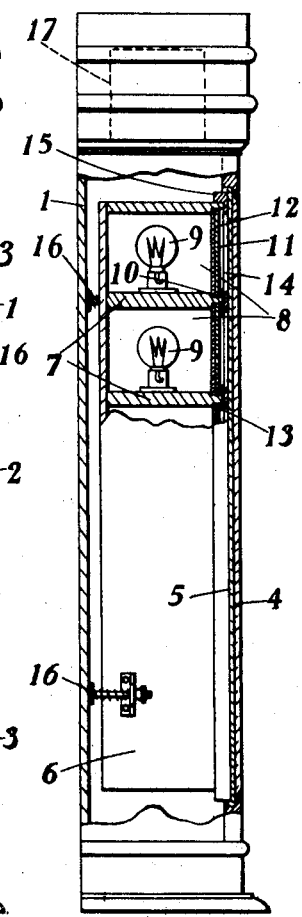

July 2, 1929.  E. NISSEN ET AL  1,719,518
ADVERTISING DEVICE
Filed Feb. 13, 1929   3 Sheets-Sheet 2
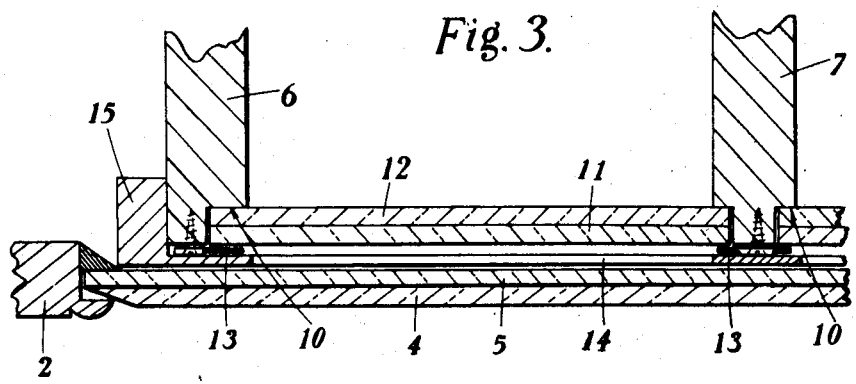
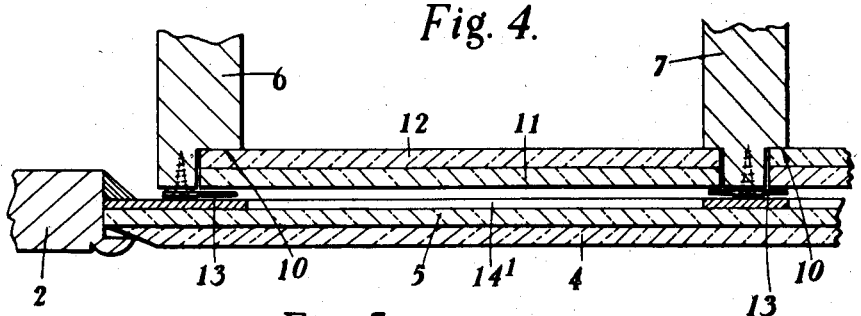
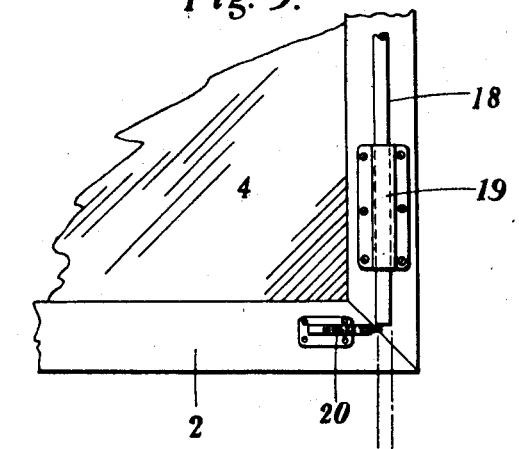
INVENTORS
Einar Nissen.
Andreas Peter Nissen.
BY
Stone, Boyden, Mackieth
ATTORNEYS.

July 2, 1929. E. NISSEN ET AL 1,719,518
ADVERTISING DEVICE
Filed Feb. 13, 1929 3 Sheets-Sheet 3
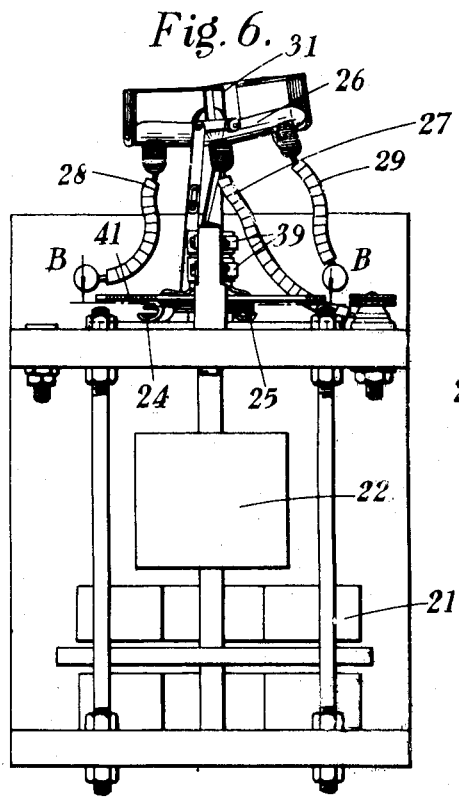
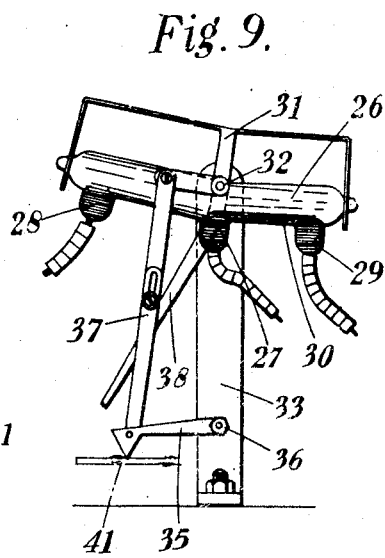
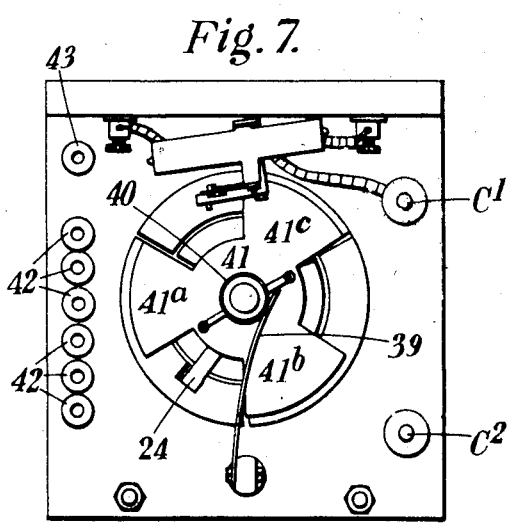
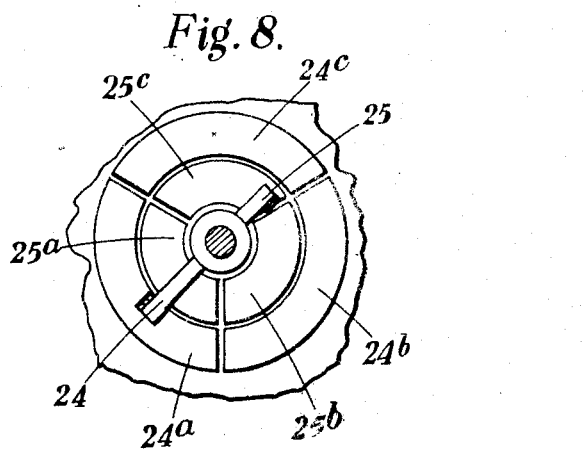
INVENTORS
Einar Nissen
Andreas Peter Nissen
BY
Stone, Boyden, Mack &c.
ATTORNEYS Patented July 2, 1929.

1,719,518

UNITED STATES PATENT OFFICE.

EINAR NISSEN AND ANDREAS PETER NISSEN, OF LONDON, ENGLAND.

ADVERTISING DEVICE.

Application filed February 13, 1929. Serial No. 339,502.

The invention relates to an improved advertising device of the kind which comprises a box or hollow case, the front of which is formed of a transparent mirror, positioned in a suitable framework, and the inside of which is adapted to be illuminated by electric lamps or the like disposed therein, so that the reflecting action of the transparent mirror ceases and photographic diapositives or other transparent pictures, disposed in a suitable frame behind the mirror, may be seen.

An object of the invention is to provide a second box, disposed within the hollow case and behind the transparent mirror, this second box being divided up into any number of separate compartments, each of which may be separately illuminated, and the front of each being adapted to accommodate a transparent picture. Behind each picture is placed a translucent sheet, for example, white glass, in order to evenly illuminate the picture. Further, to increase the illuminating power of the lamps, the inside of each box may be lined with mirrors or painted white.

A further object of the invention is the provision of means for resiliently mounting whereby, when the front of the hollow case, which is preferably hinged to the body of the case and in which is positioned the transparent mirror, is closed, the box is pushed slightly backwards against the action of springs so that the front of the box is held firmly in contact with the back of the mirror, thereby preventing the breaking of the mirror due to any vibration of the box, and, at the same time, holding the pictures right against the mirror glass.

A further object of the invention consists in the means whereby the pictures are inserted in the front of the box and a separate frame or mask is placed over them, so that the complete arrangement may be viewed before closing the front of the case. The mask may be arranged on the back of the mirror, whereby, on closing the front of the case, it is automatically put into position.

A further object of the invention is to provide the hinged front of the case with supporting means whereby, when it is opened, the weight of the front is taken by this supporting means.

Another object of the invention is to provide a special construction for the device for illuminating the compartments in sequence. If desired, two or more compartments may be illuminated simultaneously. According to this object, the device consists of a rotary switch, the brushes of which are adapted to be driven by means of an electric meter mechanism or motor. To prevent sparking at the contacts, a mercury contact breaking device is arranged so that it closes the circuit of the lamps after the brush has engaged with a fresh contact, and to open the circuit before the brush leaves the contact. All sparking is therefore confined to the tube in which the mercury contacting device is arranged. In one form of the invention this contacting device comprises a tube containing mercury, which is adapted to be tilted whereby the mercury flows to close or open the circuit according to the direction in which the tube is tilted. Preferably the automatic circuit breaking device is arranged within the hollow case.

In order that the invention may be more clearly understood, the preferred form will now be described with reference to the accompanying drawings in which:—

Fig. 1 shows a partly sectional front view of the preferred form of the invention.

Fig. 2 shows a side elevation, also partly in section, along the line A—A of Fig. 1.

Fig. 3 shows, on an enlarged scale, the method of securing the frame or mask in front of the pictures.

Fig. 4 shows alternative method to that shown in Fig. 3.

Fig. 5 shows details of the supporting device for the hinged front of the case.

Fig. 6 shows a side elevation of the automatic contact breaking device.

Fig. 7 shows a plan view of the device.

Fig. 8 shows a view of the contacts as viewed from the line B—B of Fig. 6.

Fig. 9 shows an enlarged view of the mercury contact device.

Referring to the drawings, 1 represents a hollow casing of wood, or other suitable material, and of any desired shape and contour, the front 2 of which is hinged to the main casing at 3. 4 is a transparent mirror which operates like an ordinary mirror so that objects placed behind it are quite invisible. The back of the mirror is covered with another sheet of glass 5 to prevent the reflecting surface from becoming scratched and the whole is secured in the opening in the front 2 of the case.

Behind the mirror and within the case is arranged a box 6 which is divided by a partition 7 into several compartments 8. Each compartment has arranged therein one or more electric lamps 9. The front edges of each of the partitions are rabbeted at 10 (see Fig. 3) in order to accommodate the photographic diapositive or transparent picture 11 and the translucent screen of white glass 12 placed behind the picture. Small swivel catches 13 hold the pictures and glass plates in position.

When all the pictures are arranged in position a frame or mask 14 with a flanged edge 15 is placed over the front of the box. It is thus possible to see the exact disposition of the pictures before closing the hinged front of the case. The hinged front 2 holds this mask in position but, if desired, separate catches may be provided.

An alternative arrangement is shown in Fig. 4 in which the mask 14' is secured in the case front and directly behind the transparent mirror. In this case, on closing the door, the mask is automatically positioned in front of the box.

The box 6 is resiliently mounted within the case 1 by means of spring devices 16. Each of the devices shown comprises a rod member mounted upon the case 1 adapted to slide through an eye on the box, a spring tending to push the box forwards against the back of the transparent mirror. This keeps this box firmly in contact with the mirror and prevents any vibrations which may damage or break the mirror, and, at the same time, holds the pictures right against the mirror glass. Although a particular form of spring device is shown in the drawings, any other suitable arrangement may be used which produces the desired result.

The automatic circuit breaking device 17, the preferred form of which will be hereinafter described with reference to Figs. 6 to 9, is preferably located in the top part of the case as shown in broken lines.

If the advertising device is fairly large, the case front 2 containing the mirror 4 is rather heavy, and it is preferable to arrange a support behind the front 2 which is used to support this front when open. Thus no undue strain is imparted to the hinges 3. In the form shown, the support comprises a stick or rod 18 adapted to slide through a tunnel or hollow guiding member 19. The member 19 is preferably of such length that no further guides are required for the rod 18. A locking bolt 20 is adapted to engage beneath the bottom of the rod when it is in its inoperative position, and in a hole in the rod when it is lowered. Thus the rod 18 when lowered to the ground (as shown in broken lines) acts as a support for the case front.

Referring to Figures 6–9 which show the automatic circuit breaking device, the brushes 24, 25 may, for instance, be driven by a driving motor or mechanism as used in an electric meter, as shown diagrammatically at 21, through any suitable reduction gear 22. The speed of the motor may be controlled by any well-known means, for example, a carbon resistance, providing adjustable pole pieces on the motor, etc. In order that the motor may run for a long time without attention, the main spindle preferably runs on a jewel.

The brushes 24 and 25 are each adapted to wipe over a separate row of contacts $24^a$, $24^b$, etc., $25^a$, $25^b$ ... etc., preferably arranged in two concentric circles around the driven shaft as shown in Fig. 8. In the drawings three contacts are shown in each row and this allows, in the case of an eighteen-compartment advertising device, of six different changes, three compartments being illuminated at the same time. Current is conveyed to the brushes 24 and 25 through the brushes 39 which engage with contact rings 40 on the switch shaft.

In order to prevent sparking between the contacts and the brushes, and thus causing undue wear upon them, a mercury contacting device is arranged so that all sparking is confined to this device.

The device is shown enlarged in Fig. 9 and comprises a tube of glass or other suitable material 26, having three projections in which the contacts 27, 28 and 29 are sealed. The tube contains a small quantity of mercury 30 so that by tilting the tube either one way or the other, the contacts 27 and 28, or 27 and 29, are bridged and electrically connected by the mercury. The tube is mounted in a suitable frame 31 and is mounted to pivot on the pin 32 projecting from the upright supporting member 33. The cam 34, secured to the frame 31, is adapted to be moved by the rocking lever 35, pivoted at 36, which is connected thereto by an adjustable rod 37. As all the weight is to the left, the device tends to tilt in an anti-clockwise direction, and to limit this movement a suitable stop is provided. In the drawings, this comprises a lever 38 secured to the frame 31, which is adapted to engage with the pivot 36.

The contact 27 is connected to one of the main terminals $C^1$, and the contacts 28 and 29 are each connected to one of the brushes 24, 25, for example, 28 is connected to brush 24 and 29 is connected to brush 25.

Mounted on the switch shaft above the brushes 24 and 25 is a rocking member 41 which has three equally disposed portions 41ª, 41ᵇ, 41ᶜ projecting therefrom. In cases where more or less than six contacts are employed, the number of these projections will be altered to suit the particular requirements. The rocking member is adapted to rock the mercury contact by alternately lifting it, through the rocking lever 35, and then allowing it to fall again until stopped by the lever 38 engaging with the stop 36. The rocking member 41 is so disposed on the switch shaft that it opens the circuit to the brushes 24 before this brush leaves a contact, and, at the same time, closes the circuit of the brush 25 which, by now, has already reached another contact. The device again operates before brush 25 leaves this contact, to open the circuit of this brush and close the circuit of brush 24. Thus all sparking is confined to the mercury contacts in the tube 26. Each of the contacts 24ª etc., 25ª etc., is connected to one of the sockets 42, the other socket 43 being directly connected to the other main terminal C². The sockets are so arranged that a seven-pin plug, carrying the wires connected to the lamps, can only be inserted in the correct manner.

Although the preferred form of this automatic circuit breaker has been described, it is obvious that it may be constructed in several other ways which come within the scope of the invention. For example, the contacts may be arranged in only a single row. The mercury contacting device would then only be a single-throw device, alternately opening and closing the circuit as the single brush passed from one contact to the next.

We claim:—

1. An advertising device comprising the combination of a casing, a transparent mirror in the front of said casing, a second box mounted in said casing, a transparent picture, means for securing the transparent picture in the front of said second box, and means for illuminating the interior of said second box.

2. An advertising device comprising the combination of a casing, a transparent mirror in the front of said casing, a second box mounted in said casing, partitions for dividing said second box into a number of separate compartments, means for securing a transparent picture in the front of each compartment, and means for separately illuminating each of said compartments.

3. An advertising device comprising the combination of a casing, a transparent mirror in the front of said casing, a second box, resilient means for supporting said second box in said casing, means for securing a transparent picture in the front of said second box, and means for illuminating the interior of said second box.

4. An advertising device comprising the combination of a casing, a transparent mirror in the front of said casing, a second box in said casing, partitions for dividing said second box into a number of separate compartments, means for securing a transparent picture in the front of each compartment, and means for separately illuminating each of said compartments.

5. An advertising device comprising the combination of a casing, a transparent mirror in the front of said casing, a second box mounted in said casing, a transparent picture, a translucent sheet, means for mounting said transparent picture and translucent sheet in the front of said second box, and means for illuminating the interior of said second box.

6. An advertising device comprising the combination of a casing, a transparent mirror in the front of said casing, a second box mounted in said casing, partitions for dividing said second box into a number of separate compartments, a number of transparent pictures, a number of pieces of white glass, means for securing a piece of white glass and a transparent picture in the front of each of said compartments, and means for separately illuminating each of said compartments.

7. An advertising device comprising the combination of a casing, a transparent mirror in the front of said casing, a second box mounted in said casing, a transparent picture, means for securing the transparent picture in the front of said second box, a mask, adapted to be placed in front of the picture but behind the mirror, so as to clearly define the picture, and means for illuminating the interior of said second box.

8. An advertising device comprising the combination of a casing, a transparent mirror in the front of said casing, a second box mounted in said casing, partitions for dividing said second box into a number of separate compartments, means for securing a transparent picture in the front of each compartment, a mask, adapted to be positioned in front of the pictures and behind the mirror, and means for separately illuminating each of said compartments.

9. An advertising device comprising the combination of a casing, a transparent mirror in the front of said casing, a second box, resilient means for supporting said second box in said casing, partitions for dividing said second box into a number of separate compartments, a plurality of transparent pictures, a plurality of pieces of white glass, means for securing a transparent picture and a piece of white glass in the front of each of said compartments, a mask, adapted to be positioned in front of the pictures and behind the mirror and means for separately illuminating each of said compartments.

10. An advertising device comprising the combination of a casing, the front of which is hinged, a transparent mirror secured in said hinged front, a second box, means for resiliently supporting said second box in said casing, partitions for dividing said second box into a number of separate compartments, means for securing a transparent picture in the front of each compartment, a mask, adapted to be positioned in front of the pictures and behind the mirror, and means for separately illuminating each of said compartments, the second box being so positioned within the casing that, on closing the hinged front, the mirror bears against the front of the second box and moves it backwards against the action of its resilient supporting means.

11. In combination with an advertising device comprising a casing, the front of which is hinged, a transparent mirror secured in said hinged front, a second box mounted in said casing, means for securing a transparent picture in the front of said second box, and means for illuminating the interior of said second box, means for supporting the hinged front when it is open.

12. An advertising device comprising the combination of a casing, the front of which is hinged, a transparent mirror secured in said hinged front, a second box, means for resiliently supporting said second box, in said casing, partitions for dividing said second box into a number of separate compartments, means for securing a transparent picture in the front of each compartment, a mask mounted on the back of said transparent mirror, and means for separately illuminating each of said compartments, the second box being so positioned in the casing that, on closing the hinged front, the mask is located directly in front of the pictures, and the second box is moved backwards against the action of its resilient supporting means.

13. An advertising device comprising the combination of a casing, the front of which is hinged, a transparent mirror secured in said hinged front, a second box mounted in said casing, partitions for dividing said second box into a number of separate compartments, means for securing a transparent picture in the front of each compartment, a mask, mounted on the back of said transparent mirror, and means for separately illuminating each of said compartments, the second box being so positioned in the casing that, on closing the hinged front, the mask is located directly in front of the pictures.

14. An advertising device comprising the combination of a casing, a transparent mirror in the front of said casing, a second box mounted in said casing, means for securing a transparent picture in the front of said second box, and means for periodically illuminating the interior of said second box.

15. An advertising device comprising the combination of a casing, a transparent mirror in the front of said casing, a second box mounted in said casing, partitions for dividing said second box into a plurality of separate compartments, means for securing a transparent picture in the front of each compartment, means for separately illuminating said compartments in sequence.

16. An advertising device as claimed in claim 15 wherein two or more of said compartments are illuminated simultaneously.

17. An advertising device comprising the combination of a casing, a transparent mirror in the front of said casing, a second box mounted in said casing, partitions for dividing said second box into a plurality of separate compartments, means for securing a transparent picture in the front of each compartment, means for separately illuminating each of said compartments, an automatic circuit breaker for illuminating said compartments in sequence, and an electric meter motor for driving said automatic circuit breaker.

18. An advertising device comprising the combination of a casing, a transparent mirror in the front of said casing, a second box mounted in said casing, partitions for dividing said second box into a plurality of separate compartments, means for securing a transparent picture in the front of each compartment, means for separately illuminating each of said compartments, an automatic circuit breaker for illuminating said compartments in sequence, and a mercury contact breaking device which makes and breaks the circuit so that all sparking, due to the operation of the automatic circuit breaker, is confined to the said mercury device.

19. An advertising device comprising the combination of a casing, a transparent mirror in the front of said casing, a second box mounted in said casing, partitions for dividing said second box into a plurality of separate compartments, means for securing a transparent picture in the front of each compartment, means for separately illuminating each of said compartments, and an automatic circuit breaker for illuminating said compartments in sequence comprising a spindle, means for driving said spindle, a plurality of contacts arranged in concentric circles around the said spindle, brushes mounted on said spindle and adapted to wipe over said contacts, a mercury contact device, and means for operating said mercury device so that the circuit through a brush is closed after the brush has engaged with a contact, and is opened before the brush leaves that contact.

20. An advertising device comprising the combination of a casing, a transparent mirror in the front of said casing, a second box mounted in said casing, partitions for dividing said second box into a plurality of separate compartments, means for securing a transparent picture in the front of each compartment, means for separately illuminating each of said compartments, and an automatic circuit breaker for illuminating said compartments in sequence comprising a spindle, means for driving said spindle, a plurality of contacts arranged in concentric circles around the said spindle, brushes mounted on said spindle and adapted to wipe over said contacts, a tilting mercury contact device, a rocking member mounted on the said spindle, and an operative connection between the said rocking member and the said mercury device, whereby the circuit through a brush is closed after the brush has engaged with a contact and is opened before the brush leaves that contact.

In testimony whereof we have hereunto affixed our signatures.

ANDREAS PETER NISSEN.
EINAR NISSEN.